United States Patent
Todoriki et al.

(10) Patent No.: US 10,839,258 B2
(45) Date of Patent: Nov. 17, 2020

(54) COMPUTER-READABLE RECORDING MEDIUM, DETECTION METHOD, AND DETECTION DEVICE

(71) Applicant: FUJITSU LIMITED, Kawasaki-shi, Kanagawa (JP)

(72) Inventors: Masaru Todoriki, Kita (JP); Yuhei Umeda, Kawasaki (JP); Ken Kobayashi, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 16/262,974

(22) Filed: Jan. 31, 2019

(65) Prior Publication Data

US 2019/0236407 A1    Aug. 1, 2019

(30) Foreign Application Priority Data

Jan. 31, 2018 (JP) .................. 2018-015849

(51) Int. Cl.
  *G06K 9/62* (2006.01)
  *G06K 9/00* (2006.01)
  *G06N 7/08* (2006.01)

(52) U.S. Cl.
  CPC ....... *G06K 9/6232* (2013.01); *G06K 9/00523* (2013.01); *G06K 9/00536* (2013.01);
  (Continued)

(58) Field of Classification Search
  None
  See application file for complete search history.

(56) References Cited

U.S. PATENT DOCUMENTS

| 9,430,688 B1 * | 8/2016 | Ray .................... G06K 9/38 |
| 2007/0036434 A1 * | 2/2007 | Saveliev ................ G06K 9/52 |
| | | 382/173 |

(Continued)

FOREIGN PATENT DOCUMENTS

| JP | 2014-049100 A | 3/2014 |
| WO | 2013/145493 A1 | 10/2013 |

OTHER PUBLICATIONS

F. Erden and A. E. Cetin, "Period Estimation of an Almost Periodic Signal Using Persistent Homology With Application to Respiratory Rate Measurement," in IEEE Signal Processing Letters, vol. 24, No. 7, pp. 958-962, Jul. 2017, doi: 10.1109/LSP.2017.2699924. (Year: 2017).*

*Primary Examiner* — Fayyaz Alam
(74) *Attorney, Agent, or Firm* — Xsensus LLP

(57) ABSTRACT

A detection device adds, with regard to each of a plurality of sets of time-series data including a plurality of items, a time-shift term to at least any of the plurality of items included in each of the plurality of sets of time-series data. The detection device generates a plurality of attractors from the plurality of sets of time-series data to which the time-shift term has been added. The detection device generates a plurality of Betti sequences from each of the plurality of attractors by executing a persistent homology transformation on each of the plurality of attractors, each of the plurality of Betti sequences indicating a correspondence relationship between a Betti number and a scale value has been used for the persistent homology transformation. The detection device detects a state change in the plurality of sets of time-series data based on a time change in the plurality of Betti sequences.

5 Claims, 16 Drawing Sheets

(52) U.S. Cl.
CPC .............. *G06K 9/6267* (2013.01); *G06N 7/08* (2013.01); *G06K 2009/00738* (2013.01)

(56) References Cited

U.S. PATENT DOCUMENTS

| | | | |
|---|---|---|---|
| 2015/0046099 A1 | 2/2015 | Kamoi | |
| 2017/0147946 A1* | 5/2017 | Umeda | G06N 7/08 |
| 2018/0204324 A1* | 7/2018 | Kawaguchi | G01N 33/48 |
| 2018/0260519 A1* | 9/2018 | Rietman | G16B 45/00 |

* cited by examiner

FIG.9

SLIDING WINDOW 1 (t=1 TO 50)

| DIMENSION | RADIUS | BETTI NUMBER |
|---|---|---|
| ⋮ | ⋮ | ⋮ |
| 0 | 5 | 20 |
| 0 | 10 | 10 |
| ⋮ | ⋮ | ⋮ |
| 1 | 5 | 1 |
| 1 | 10 | 3 |
| ⋮ | ⋮ | ⋮ |

SLIDING WINDOW 2 (t=51 TO 100)

| BETTI NUMBER |
|---|
| ⋮ |
| 20 |
| 10 |
| ⋮ |
| 1 |
| 3 |
| ⋮ |

SLIDING WINDOW n (t=⋯)

| RADIUS | BETTI NUMBER |
|---|---|
| ⋮ | ⋮ |
| 5 | 20 |
| 10 | 10 |
| ⋮ | ⋮ |
| 5 | 1 |
| 10 | 3 |
| ⋮ | ⋮ |

| WINDOW START TIME | WINDOW END TIME | DISTANCE FROM REFERENCE |
|---|---|---|
| 1 | 50 | 2.3 |
| 51 | 100 | 3.1 |
| 101 | 150 | 1.2 |
| ⋮ | ⋮ | ⋮ |

(b)

| WINDOW START TIME | DISTANCE FROM REFERENCE |
|---|---|
| 1 | 2.3 |
| 51 | 3.1 |
| 101 | 1.2 |
| ⋮ | ⋮ |

FIG.11

| TIME WHEN CHANGE WAS DETECTED |
|---|
| 15:38:00 |

RADIUS: 0

RADIUS: $r_1$

RADIUS: $r_2$

RADIUS: $r_3$

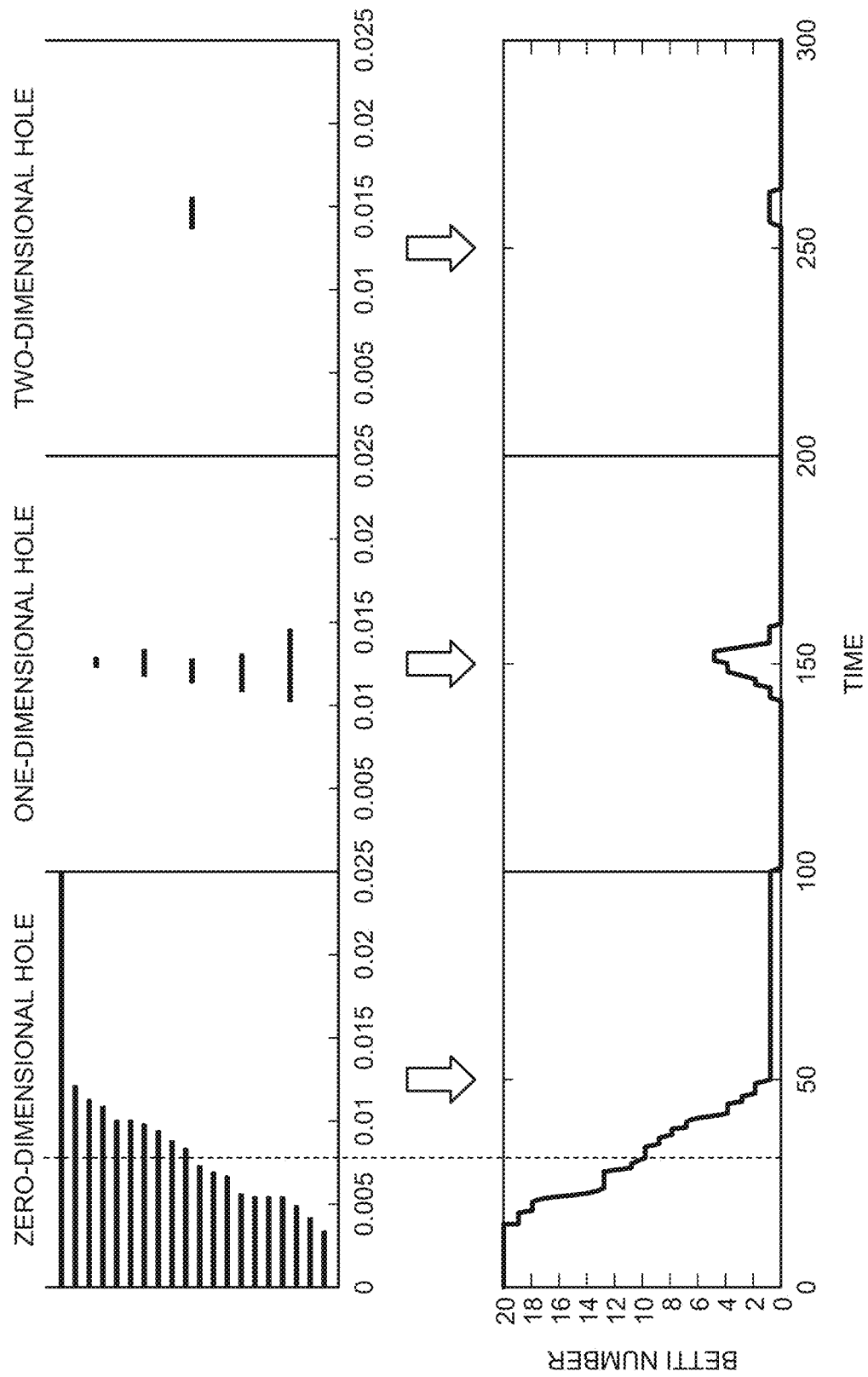

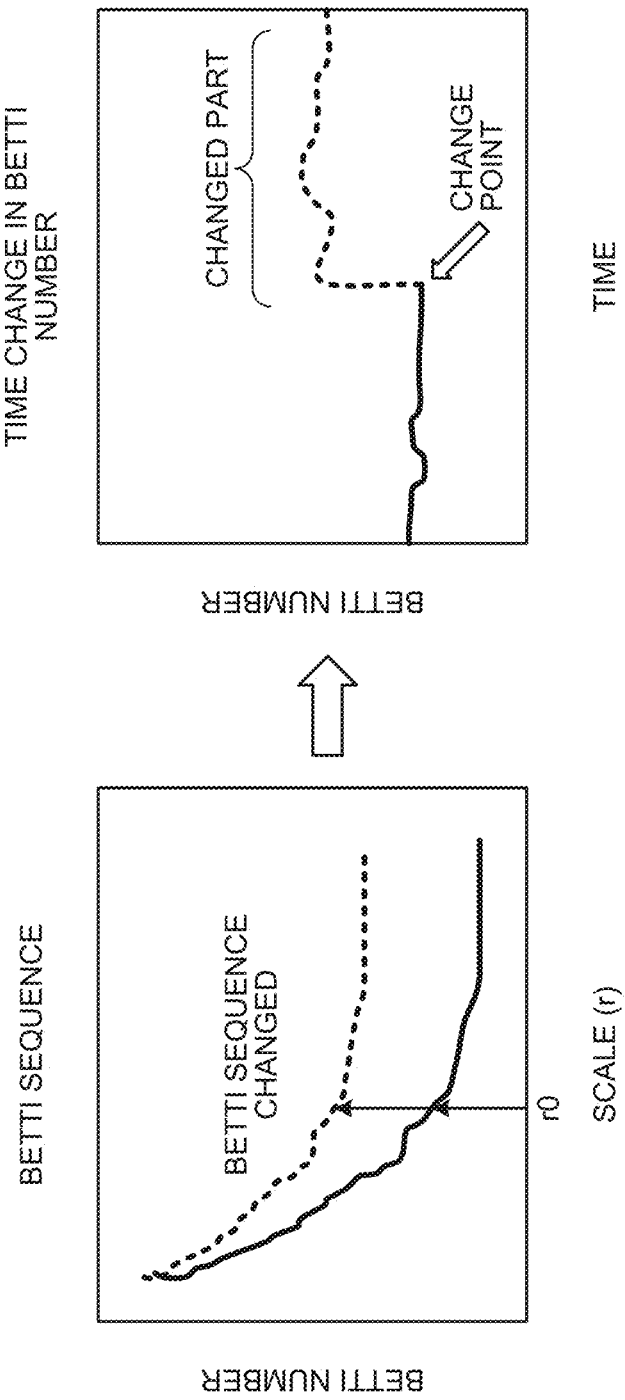

COMPUTER-READABLE RECORDING MEDIUM, DETECTION METHOD, AND DETECTION DEVICE

CROSS-REFERENCE TO RELATED APPLICATION

This application is based upon and claims the benefit of priority of the prior Japanese Patent Application No. 2018-015849, filed on Jan. 31, 2018, the entire contents of which are incorporated herein by reference.

FIELD

The embodiments discussed herein are related to a detection program, a detection method, and a detection device.

BACKGROUND

Changes in multidimensional time-series data are detected, and the state of the target is determined based on details of the detected change. Besides conventionally known detection techniques based on statistics, known techniques for detecting changes in multidimensional time-series data are techniques such as invariant analysis or subspace method that are techniques for detecting changes in the features included in data on items contained in multidimensional time-series data.

For example, invariant analysis is a technique for monitoring time correlation in multidimensional time-series data and detecting the status of a change occurring in some time series as a change in the correlation. The invariant analysis may be easily used without using the physical meaning of time-series data.

Furthermore, the subspace method is a technique for generating sub time series from one-dimensional time-series data by using a technique such as time delay and detecting a state change in the entire space based on changes in the direction or the size of the orthogonal base in the subspace defined by the sub time series. As the subspace method is linear analysis, it may conduct effective change detection on a system having high linearity or periodicity and may conduct effective change detection on changes in the density of the subspace.

Patent Literature 1: International Publication Pamphlet No. WO 2013/145493

SUMMARY

According to an aspect of an embodiment, a non-transitory computer-readable recording medium stores therein a program that causes a computer to execute a process. The process includes adding, with regard to each of a plurality of sets of time-series data including a plurality of items, a time-shift term to at least any of the plurality of items included in each of the plurality of sets of time-series data; generating a plurality of attractors from the plurality of sets of time-series data to which the time-shift term has been added; generating a plurality of Betti sequences from each of the plurality of attractors by executing a persistent homology transformation on each of the plurality of attractors, each of the plurality of Betti sequences indicating a correspondence relationship between a Betti number and a scale value has been used for the persistent homology transformation; and detecting a state change in the plurality of sets of time-series data based on a time change in the plurality of Betti sequences.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram that illustrates an example of data stored in a Betti-number data DB;

FIG. 10 is a diagram that illustrates an example of data stored in a distance data DB;

FIG. 11 is a diagram that illustrates an example of data stored in a detection data DB;

FIG. 14 is a diagram that illustrates the relationship between barcode data and generated sequential data;

FIG. 15 is a diagram that illustrates a technique for detecting a state change;

DESCRIPTION OF EMBODIMENTS

However, the above-described technology may be suitable or unsuitable for change detection depending on the type or the state of time-series data, there is a limitation on time-series data applicable to state determination, and therefore the accuracy of state determination based on multidimensional time-series data is sometimes degraded.

For example, as invariant analysis is a technique for monitoring time correlation in multidimensional time-series data, it is difficult to detect changes when the target sets of time-series data simultaneously change in the same direction. Furthermore, as the subspace method is linear analysis, it is difficult to detect changes with regard to non-linear time-series data, such as chaos time-series, as the orthogonal base varies locally and it is difficult to determine the orthogonal base in a stable manner in the entire space.

Furthermore, to select an appropriate analysis technique, it is possible to previously examine the features of multidimensional time-series data; however, even though the features are determined, it is sometimes difficult to find an appropriate analysis technique, and the work to examine the features is not easy.

According to one aspect of the present disclosure, it is an object of the present disclosure to improve the accuracy of failure detection or change detection based on time-series data.

Preferred embodiments will be explained with reference to accompanying drawings. Furthermore, the present invention is not limited to the embodiments. Moreover, the embodiments may be combined as appropriate to a degree that there is no contradiction.

[a] First Embodiment

Overall Configuration

Figure 1:
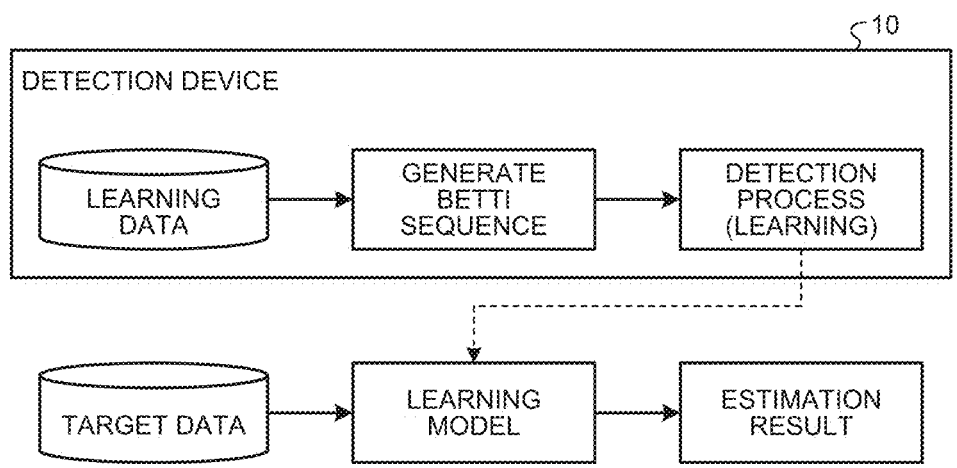
FIG. 1 is a diagram that illustrates an example of the overall detection device according to a first embodiment.

FIG. 1 is a diagram that illustrates an example of the overall detection device according to the first embodiment. As illustrated in FIG. 1, a detection device 10 according to the first embodiment is an example of a computer that conducts persistent homology transform (PH transform) on time-series data, which is an example of learning data, to generate a Betti sequence and detects a change or failure in the time-series data based on the Betti sequence.

Furthermore, the detection device 10 conducts learning of a neural network (NN), and the like, by executing a detection process (learning process) using machine learning, deep learning (DL), or the like, with a Betti sequence, the relation between a Betti sequence and a change in time-series data, or the like, as a feature value to properly determine (classify) learning data for each event. Then, by using a learning model to which a learning result is applied, an event (label) may be properly estimated with respect to the target data to be determined.

For example, the detection device 10 introduces a time-shift term (sometimes referred to as delay time) characteristic for each dimension to time-series data in multiple dimensions (hereafter, sometimes simply referred to as multidimensional time-series data) so as to reconstruct an attractor in a phase space with a higher dimension, thereby achieving change detection or failure detection by TDA (Topological Data Analysis) learning regardless of the number of dimensions of the target system.

Specifically, with regard to each of the sets of time-series data having a plurality of items, the detection device 10 adds a time-shift term to at least any of the items. Further, the detection device 10 generates an attractor from each of the sets of time-series data to which a time-shift term has been added. Then, the detection device 10 conducts persistent homology transform on each generated attractor to generate a Betti sequence from each attractor. Then, the detection device 10 detects a state change in the sets of time-series data based on a time change in each generated Betti sequence.

Thus, the detection device 10 may detect various types of changes regardless of the type or the state of time-series data and improve the accuracy of failure detection or change detection based on multidimensional time-series data.

Example of Detection Technique

Figure 2:
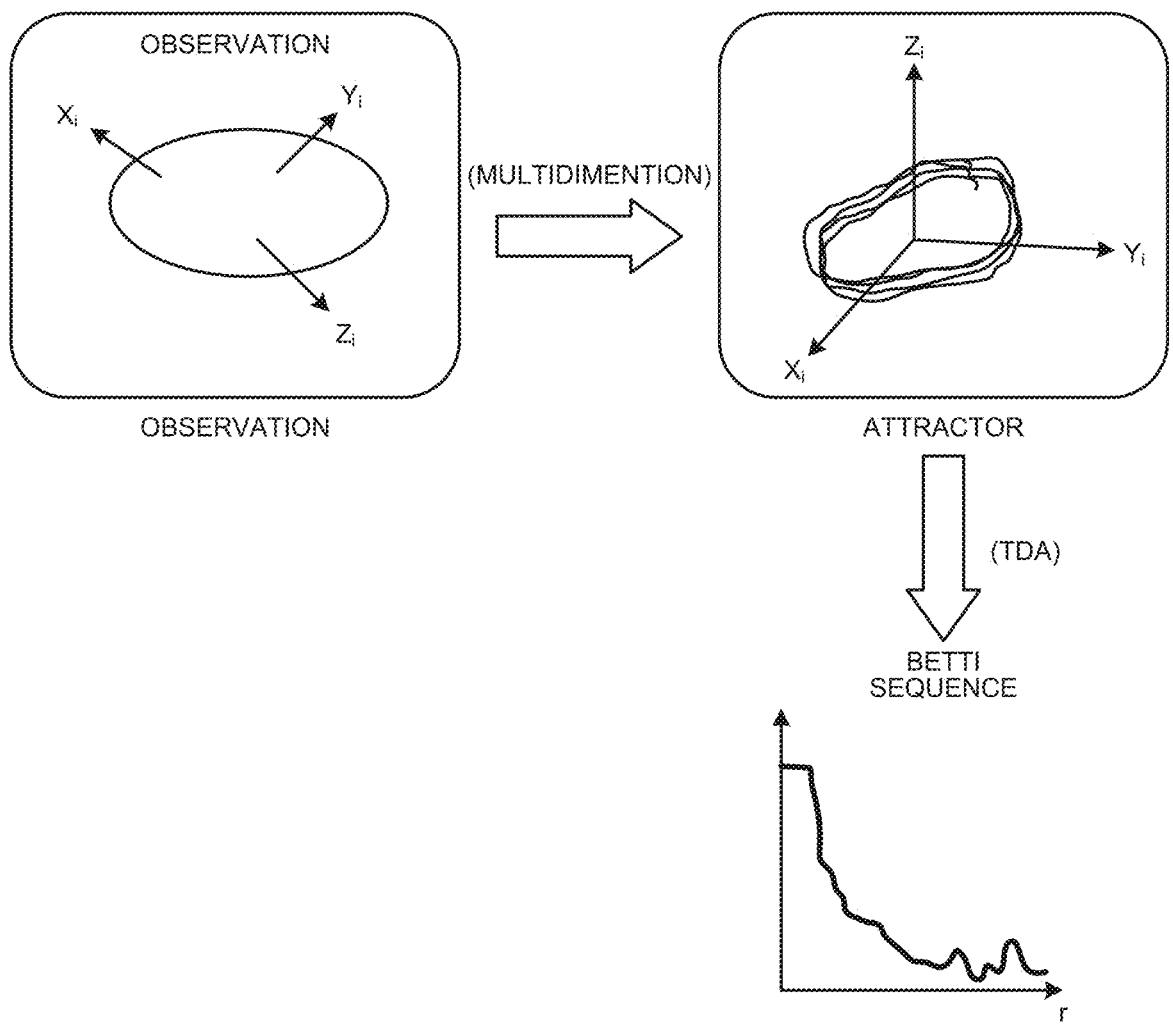
FIG. 2 is a diagram that illustrates an example of a detection technique 1 for multidimensional time-series data.

Here, with reference to FIG. 2 to FIG. 5, an example of a detection technique for multidimensional time-series data is explained. FIG. 2 is a diagram that illustrates an example of a detection technique 1 for multidimensional time-series data. The detection technique 1 illustrated in FIG. 2 is a technique to generate attractors including a point where a value of each set of time-series data is a coordinate, generate a Betti sequence by PH processing on an attractor, and determine a state indicated by the sets of time-series data based on a Betti sequence.

For example, as illustrated in FIG. 2, according to the detection technique 1 implemented by an information processing apparatus, or the like, when time-series data $X_t(x(1), x(2), \ldots)$, time-series data $Y_t(y(1), y(2), \ldots)$, and time-series data $Z_t(z(1), z(2), \ldots)$ are observed, three-dimensional time-series data $\{x(1), y(1), z(1), x(2), y(2), z(2), x(3), y(3), z(3), \ldots\}$ is generated.

Then, the detection technique 1 generates an attractor by directly using multidimensional time-series data. Specifically, the detection technique 1 plots generated three-dimensional time-series data in a three-dimensional (phase) space to form an attractor. Here, as the generated attractor is a set of a finite number of points, it is not an attractor but a quasi-attractor in a precise sense. Then, the detection technique 1 conducts persistent homology transform to transform the generated attractor into a Betti sequence. Then, the detection technique 1 detects a difference between attractors, i.e., a difference between sets of time-series data, based on a difference between Betti sequences, thereby detecting a state change.

In this way, when the number of dimensions of the target system is almost identified, the detection technique 1 is capable of detecting state changes with a high accuracy by directly using observed data. However, the number of dimensions is sometimes unknown for the target system and, in some actual cases, the number of sets of observed time-series data is fewer than the number of dimensions of the target system. In such a case, the detection technique 1 causes degradation in the accuracy with which a state change is detected.

Figure 3:
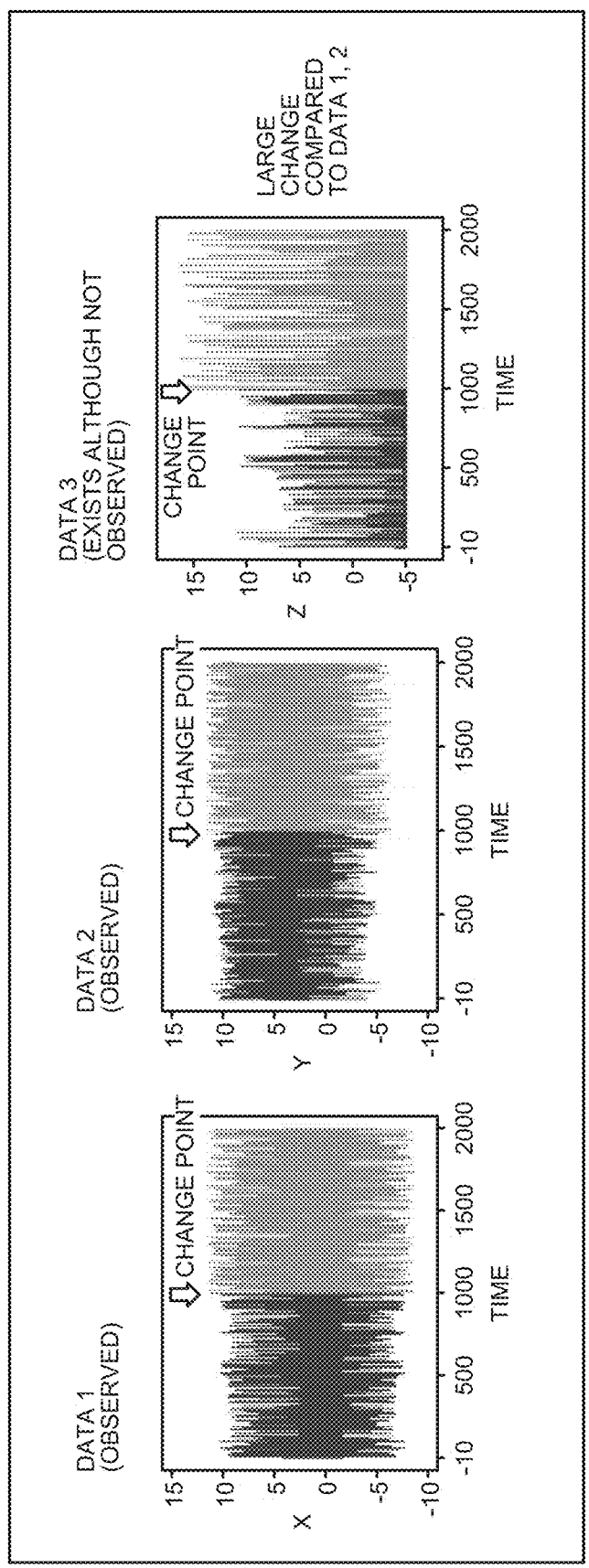
FIG. 3 is a diagram that illustrates a problem of the detection technique 1.
Figure 4:
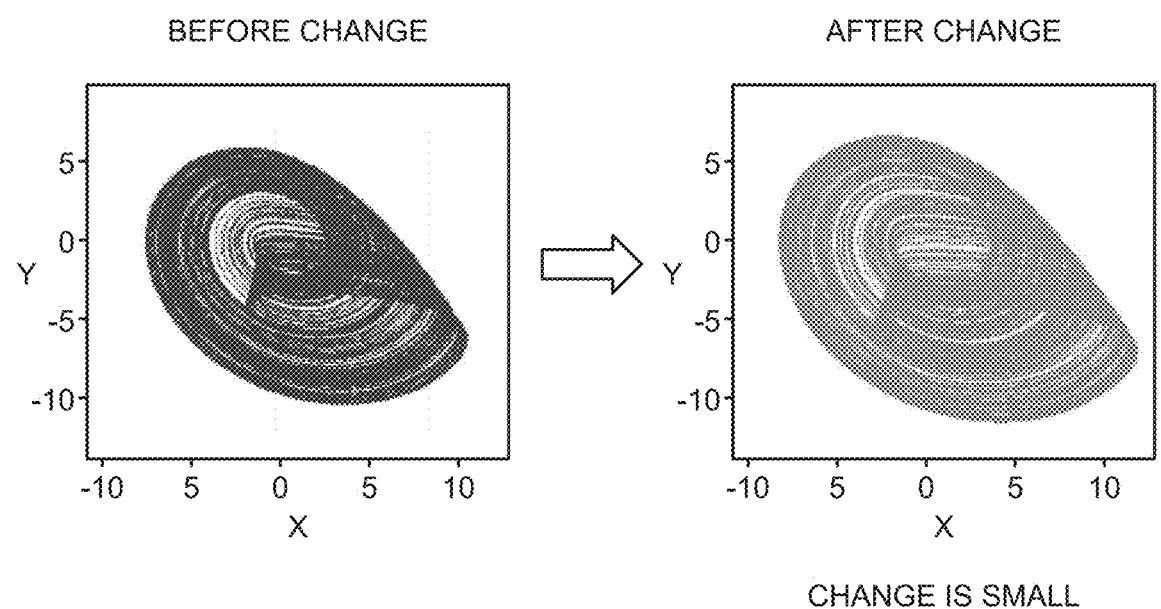
FIG. 4 is a diagram that illustrates a problem of the detection technique 1.
Figure 5:
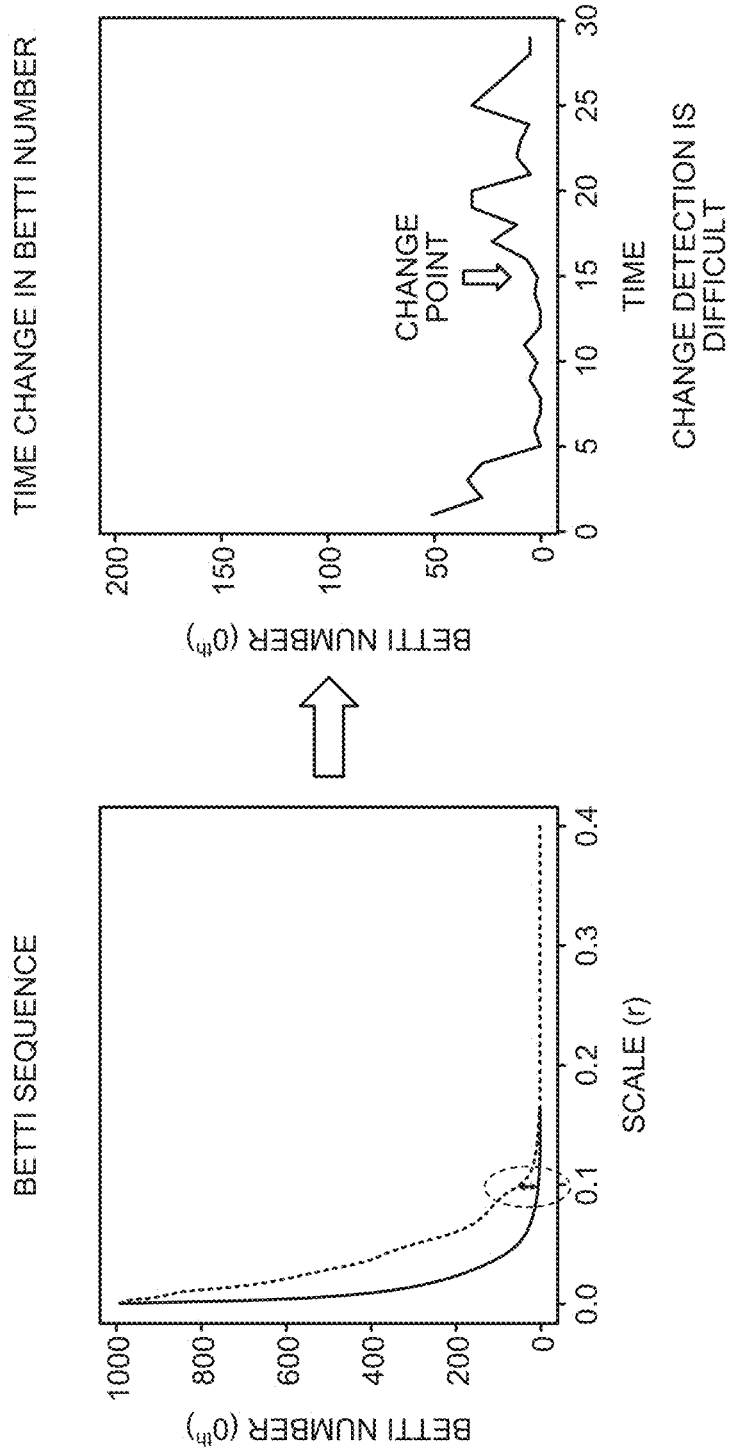
FIG. 5 is a diagram that illustrates a problem of the detection technique 1.

FIG. 3 to FIG. 5 are diagrams that illustrate a problem of the detection technique 1. FIG. 3 illustrates a state where three sets of data (data 1, data 2, data 3) are generated in the target system, only the data 1 and the data 2 have been observed, and the data 3 exists although it has not been observed. Here, a change point where a state changes appears in each of the sets of data. Further, data slightly changes in the data 1 and the data 2 before and after the change point, and data largely changes in the data 3 before and after the change point as compared to the data 1 and the data 2. That is, time-series data in the data 3 that has not been observed largely changes before and after the change point.

In this condition, as the detection technique 1 detects a state change in multidimensional time-series data by using the data 1 and the data 2 that have been observed, it is difficult to detect a change in the data before and after the change point. Specifically, as illustrated in FIG. 4, an attractor generated from time-series data before the change is similar to an attractor generated from time-series data after the change, and there is a small change. For this reason, with the detection technique 1, it is difficult to detect a state change based on a time change in each Betti sequence generated from each attractor.

The left section of FIG. 5 is a diagram that illustrates a Betti sequence generated from an attractor before a change point and a Betti sequence generated from an attractor after the change point. The vertical axis in the left section of FIG. 5 is a Betti number, and the horizontal axis is a scale (r: radius) used for PH transform. Furthermore, the right section of FIG. 5 is a diagram that illustrates a time change in the Betti sequence; the vertical axis is a Betti number, and the horizontal axis is a time. As illustrated in the left section of FIG. 5, in the case of monitoring with the scale r=0.1, the amount of detected change is small before and after the change point, and it is smaller than the normal fluctuation range. Therefore, as illustrated in the right section of FIG. 5, even though a time change in the Betti number is checked, a change in the Betti number is small before and after the area (sometimes referred to as change point) where the Betti number changes, and there is difficulty in detecting a state change.

That is, the detection technique 1 enables detection of the behavior of observed time-series data (the data 1, the data 2) but does not enable detection of the behavior of time-series data (the data 3) that has not been observed. Generally, state θ of time-series data is determined based on the following dominant law f.

1. $\theta_{i+1} = f(\theta_i, \theta_{i-1}, \theta_{i-2}, \ldots)$
2. $\theta_i = \{x_i, y_i, z_i, \ldots\}$ is state $\theta_i$ at time i and it is composed of several variables.
3. $x_i, y_i, z_i$ are variables, and each forms time-series data.

Although it is difficult to observe all sets of time-series data on variables that constitute the dominant law, the variables interact with each other in accordance with time evolution, and as a result, each set of time-series data holds each other's information. Thus, according to the detection technique 1, it is difficult to acquire information on time-series data (the data 3) that has not been observed, and accordingly a state change in the time-series data is missed.

Therefore, according to the present embodiment, a proper condition is given, and information on time-series data that has not been observed is extracted from a limited number of sets of observable time-series data, whereby the accuracy with which a state is determined based on multidimensional time-series data is improved. That is, the present embodiment allows higher-accuracy state determination in the case of application to the target system of which the number of dimensions is unknown, as compared with the above-described detection technique 1.

Functional Configuration

Figure 6:
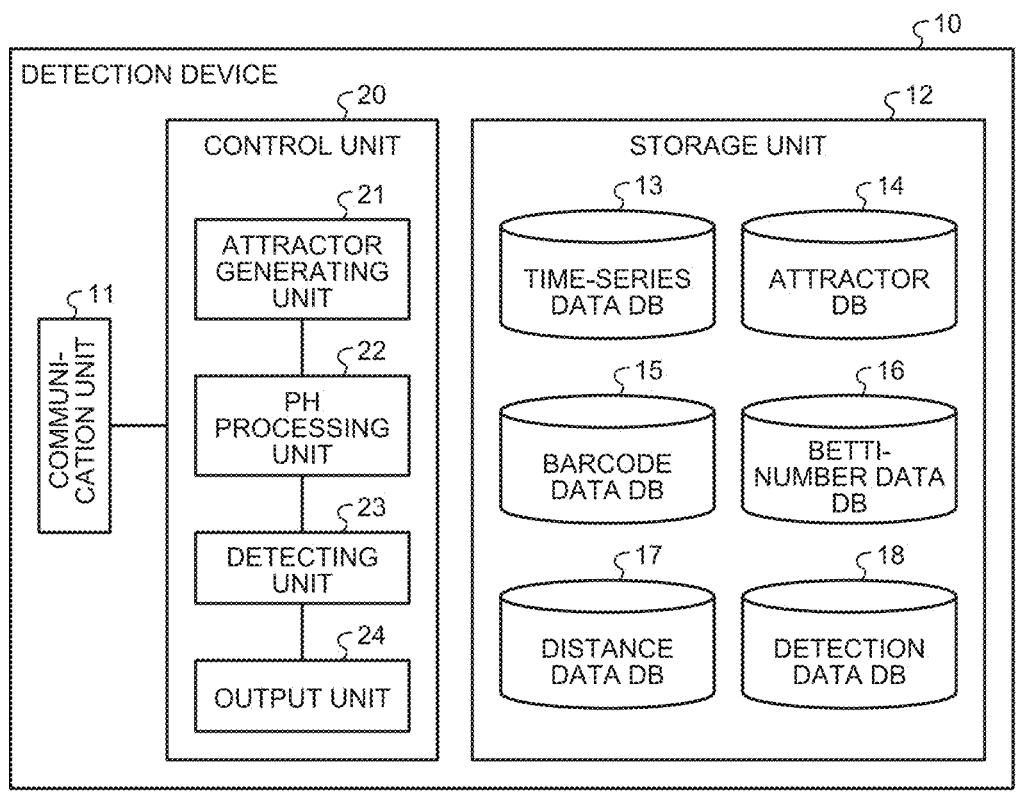
FIG. 6 is a functional block diagram that illustrates a functional configuration of the detection device according to the first embodiment.

FIG. 6 is a functional block diagram that illustrates a functional configuration of the detection device 10 according to the first embodiment. As illustrated in FIG. 6, the detection device 10 includes a communication unit 11, a storage unit 12, and a control unit 20.

The communication unit 11 is a processing unit that controls communications with other devices, and it is for example a communication interface. For example, the communication unit 11 receives processing start commands from a terminal of an administrator. Furthermore, the communication unit 11 receives time-series data (learning data) from a terminal of an administrator, or the like, and stores it in a time-series data DB 13.

The storage unit 12 is an example of a storage device that stores programs and data, and it is, for example, a memory or a hard disk. The storage unit 12 stores the time-series data DB 13, an attractor DB 14, a barcode data DB 15, a Betti-number data DB 16, a distance data DB 17, and a detection data DB 18.

Figure 7:
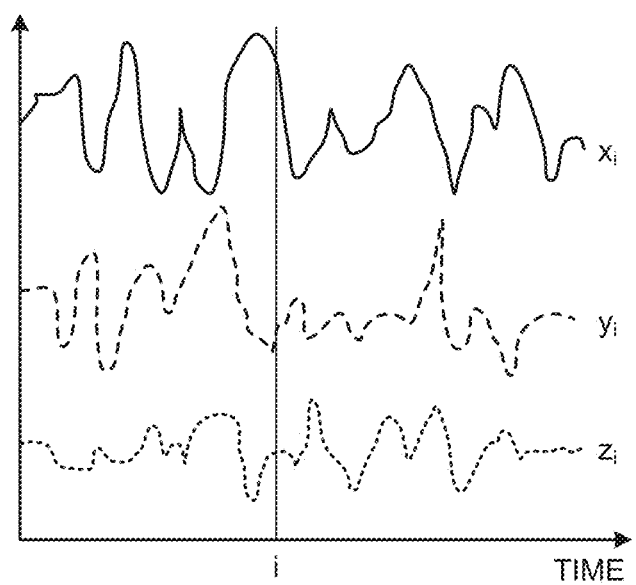
FIG. 7 is a diagram that illustrates an example of multidimensional time-series data stored in a time-series data DB.

The time-series data DB 13 is a database that stores time-series data. FIG. 7 is a diagram that illustrates an example of multidimensional time-series data stored in the time-series data DB 13. FIG. 7 illustrates a graph of three-dimensional time-series data; an item x has a value $x_i$ at a time i, an item y has a value $y_i$ at the time i, and an item z has a value $z_i$ at the time i. Time-series data is biological data (time-series data such as brain waves, pulses, or body temperature) other than heart rate, wearable sensor data (time-series data of a gyroscope, acceleration sensor, or geomagnetic sensor), financial data (time-series data such as interest rate, commodity price, balance of international payments, or share price), natural environment data (time-series data such as temperature, humidity, or carbon dioxide concentration), or social data (data such as labor statistics or population statistics), or the like.

According to the present embodiment, the multidimensional time-series data illustrated in FIG. 7 is processed, and the state indicated by the multidimensional time-series data is determined. Although FIG. 7 illustrates an example where the number of dimensions is three, this is not a limitation, and it may be two dimensions or four or more dimensions. Furthermore, according to the present embodiment, the multidimensional time-series data is an example of time-series data having a plurality of items.

The attractor DB 14 is a database that stores an attractor generated by the control unit 20 described later. Stored attractors are explained in detail later. Furthermore, characteristics of the original multidimensional time-series data are applied to an attractor, and the analogous relationship between the attractors is equivalent to the analogous relationship between the sets of original multidimensional time-series data. Similarity between an attractor and another attractor means similarity between the sets of original multidimensional time-series data. Similar attractors are generated from sets of multidimensional time-series data having the same characteristics but different phenomena (appearances).

The barcode data DB 15 is a database that stores barcode data that is generated by using the birth radius and the death radius of a generator (i.e., hole) of a homology group in the process of persistent homology computation.

Figure 8:
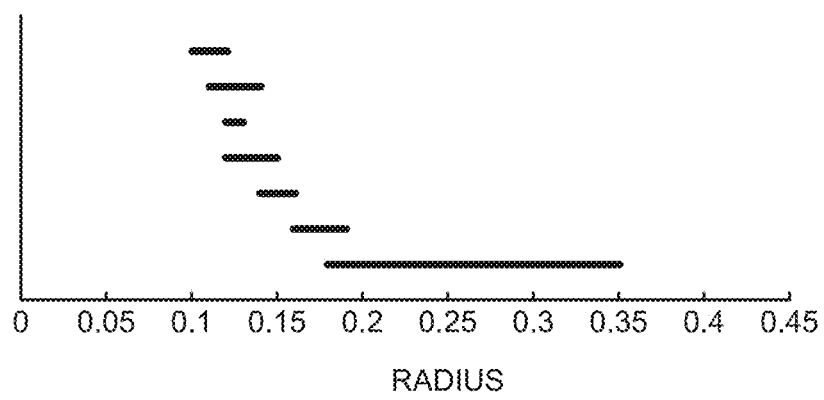
FIG. 8 is a graph that illustrates an example of data stored in a barcode data DB.

FIG. 8 is a graph that illustrates an example of data stored in the barcode data DB 15. In FIG. 8, a value in the horizontal axis indicates a radius, and each line segment corresponds to a single hole. The radius that corresponds to the extreme left of a line segment is the birth radius of a hole, and the radius that corresponds to the extreme right of a line segment is the death radius of a hole. A line segment is called a persistent section. With this bar code diagram, it is understood that for example there are two holes when the radius is 0.18.

The Betti-number data DB 16 is a database that stores information related to a Betti sequence generated from barcode data. FIG. 9 is a diagram that illustrates an example of data stored in the Betti-number data DB 16. In the example of FIG. 9, data including a dimension, a radius, and a Betti number is stored with regard to each sliding window that is an engine for extracting the target multidimensional time-series data to be processed, and a Betti sequence in each hole dimension is connected. By conducting persistent homology processing, characteristics of the original multidimensional time-series data, indicated by an attractor, may be applied to a Betti sequence. In the example of FIG. 9, a sliding window 1 indicates that the Betti number is 20 in 0 dimensions and with the radius of 5.

The distance data DB 17 is a database that stores the relationship between a sliding window and the distance to the reference Betti sequence. FIG. 10 is a diagram that illustrates an example of data stored in the distance data DB 17. As illustrated in FIG. 10(*a*), the distance data DB 17 stores the start time of a sliding window, the finish time of a sliding window, and the distance to the reference Betti sequence in a related manner. Furthermore, as illustrated in FIG. 10(*b*), the distance data DB 17 stores the start time of a sliding window and the distance to the reference Betti sequence in a related manner.

The example of FIG. 10(*a*) indicates that, when the start time of the sliding window is 1 and the finish time is 50, the distance to the reference Betti sequence (e.g., the Betti sequence generated for the sliding window a predetermined time earlier) is 2.3. Furthermore, the example of FIG. 10(b) indicates that, when the start time of the sliding window is 51, the distance to the reference Betti sequence is 3.1.

The detection data DB 18 is a database that stores the time when a state change was detected. FIG. 11 is a diagram that illustrates an example of data stored in the detection data DB 18. As illustrated in FIG. 11, the detection data DB 18 stores the time when a change was detected, and the example of FIG. 11 indicates that a state change in time-series data was detected in "15:38:00".

The control unit 20 is a processing unit that controls the overall process of the detection device 10, and it is for example a processor. The control unit 20 includes an attractor generating unit 21, a PH processing unit 22, a detecting unit 23, and an output unit 24. Here, the attractor generating unit 21, the PH processing unit 22, the detecting unit 23, and the output unit 24 are examples of a process performed by a processor or an electronic circuit included in a processor, or the like.

The attractor generating unit 21 is a processing unit that generates an attractor from multidimensional time-series data. Specifically, the attractor generating unit 21 introduces a time-shift term characteristic for each dimension to the observed multidimensional time-series data stored in the time-series data DB 13 to generate virtual time-series data. Then, the attractor generating unit 21 generates an attractor from the generated virtual time-series data and stores it in the attractor DB 14. Furthermore, statistical techniques used in informatics, such as multidimensional autocorrelation coefficient or mutual information, are available as the technique for introducing a delay time characteristic for each dimension to multidimensional time-series data.

For example, the attractor generating unit 21 expands three-dimensional time-series data $\{X_i, Y_i, Z_i\}$ to a higher dimension by introducing a time-shift term T. More specifically, the attractor generating unit 21 introduces the time-shift term τ to the observed first time-series data "$X_i = \{x(1), x(2), x(3), \ldots\}$" to generate the second time-series data "$X_{i+\tau x} = \{x(1+_{\tau x}), x(2+_{\tau x}), x(3+_{\tau x}), \ldots\}$" and further introduces the time-shift term τ to generate the third time-series data "$X_{i+2\tau x} = \{x(1+2_{\tau x}), x(2+2_{\tau x}), x(3+2_{\tau x}), \ldots\}$". In this way, the attractor generating unit 21 generates m sets of time-series data "$X_{i+m\tau x} = \{(1+_{m\tau x}), x(2+_{m\tau x})(3+_{m\tau x}), \ldots\}$" Similarly, $Y_i$ and $Z_i$ are also expanded into higher-dimensional time-series data in group.

For example, when m=3 for $X_i$ and $Y_i$ and m=4 for $Z_i$, the following ten-dimensional time-series data is generated. Ten-dimensional time-series data={(x(1), x(1+_{\tau x}), x(1+_{\tau x}), y(1), y(1+_{\tau y}), y (1+2_{\tau y}), (z(1), z (1+_{\tau z}), z (1+2_{\tau z}), z (1+3_{\tau z}), (x(2), x(2+_{\tau x}), x(2+2_{\tau x}), y(2), y (2+_{\tau y}), y(2+2_{\tau y}), (z(2), z (2+_{\tau z}), z (2+2_{\tau z}), z (2+3_{\tau z}), (x(3), x(3+_{\tau x}), x(3+2_{\tau x}), y(3), y (3+_{\tau y}), y(3+2_{\tau y}), (z(3), z(3+_{\tau z}), z(3+2_{\tau z}), z(3+3_{\tau z})))}

Figure 12:
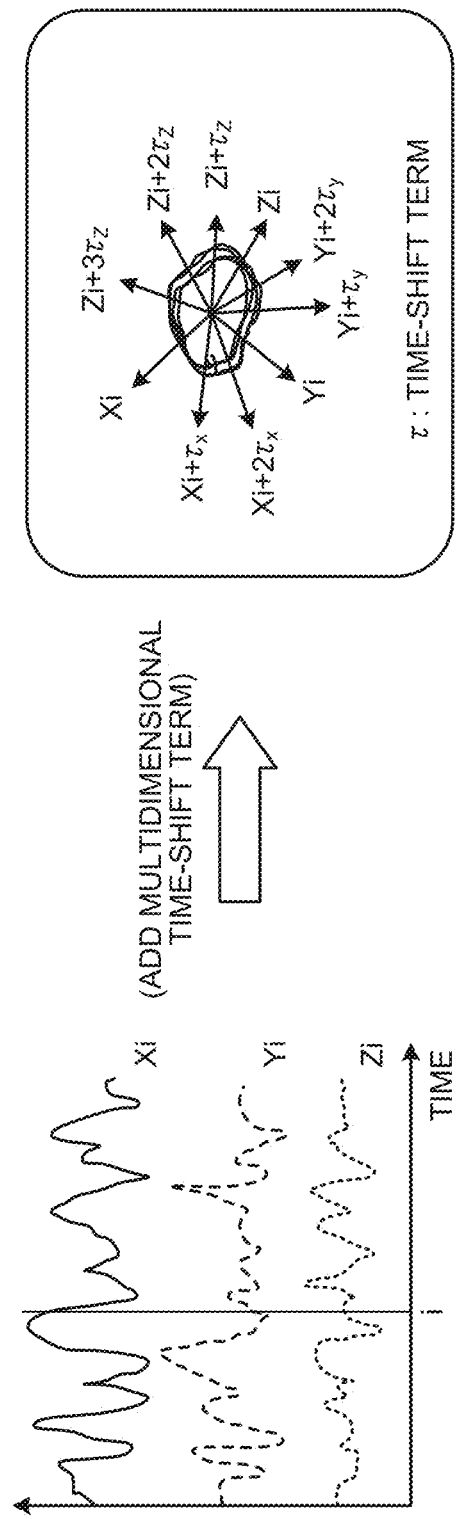
FIG. 12 is a diagram that illustrates an example where an attractor is generated from time-series data with a multidimensional time-shift term added thereto.
Figure 13A:
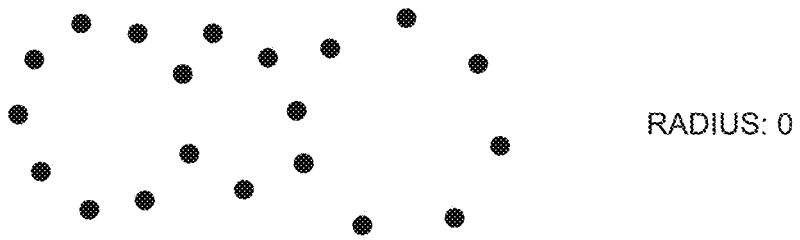
FIGS. 13A to 13D are diagrams that illustrate persistent homology.
Figure 13B:
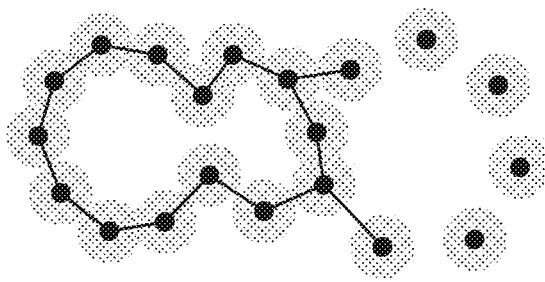
Figure 13C:
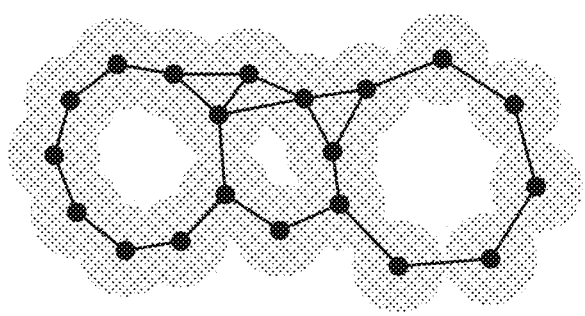
Figure 13D:
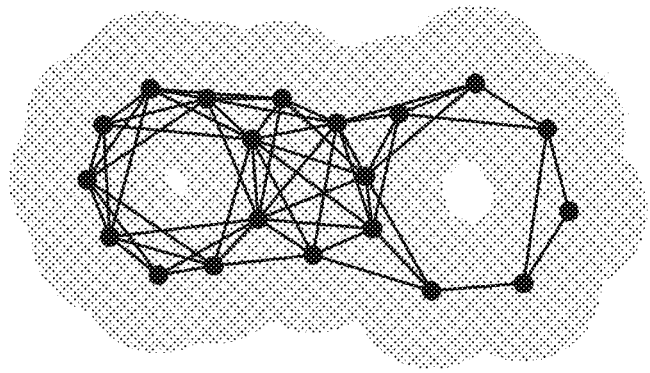

Then, the attractor generating unit 21 generates an attractor from the above-described ten-dimensional time-series data. FIG. 12 is a diagram that illustrates an example where an attractor is generated from time-series data with a multidimensional time-shift term added thereto. As illustrated in FIG. 12, the attractor generating unit 21 introduces the time-shift term τ to the observed three-dimensional time-series data $\{X_i, Y_i, Z_i\}$ to generate ten-dimensional time-series data. Then, the attractor generating unit 21 regards the ten-dimensional time-series data as ten-dimensional coordinates in a ten-dimensional (phase) space and plots them in the ten-dimensional space, thereby forming an attractor.

Here, the attractor generating unit 21 may also set a sliding window to generate an attractor. Specifically, the attractor generating unit 21 extracts a set of time-series data during the period of each sliding window, for which the start time and the finish time are specified, from multidimensional time-series data to which the time-shift term τ has been introduced. Then, the attractor generating unit 21 uses each extracted time-series data to generate an attractor.

The PH processing unit 22 is a processing unit that conducts persistent homology transform on an attractor generated by the attractor generating unit 21 to generate barcode data and Betti sequences. Here, "homology" is a technique for representing the features of the target by using the number of holes in m (m≥0) dimensions. The "hole" mentioned here is a generator of a homology group, a hole in zero dimensions is a connected component, a hole in one dimension is a hole (tunnel), and a hole in two dimensions is a cavity. The number of holes in each dimension is called a Betti number. Furthermore, "persistent homology" is a technique for characterizing transitions of a hole in m dimensions with regard to the target (here, a set of points (Point Cloud)), and persistent homology allows examinations on the features with regard to location of a point. According to this technique, each point of the target is gradually increased in a ball shape, and the birth time (represented by the radius of a ball at the birth time) and the death time (represented by the radius of a ball at the death time) of each hole in the process are specified.

Persistent homology computation is a topological technique, and it is used for analysis, and the like, of the structure of a static target (e.g., protein, molecular crystal, or sensor network) represented by a set of points. Conversely, according to the first embodiment, the target for computation is a set of points (i.e., attractor) representing the features of data that continuously changes with time. According to the first embodiment, the object is not to analyze the structure of a set of points, and therefore its target and object are entirely different from that of typical persistent homology computation.

With reference to FIGS. 13A to 13D, persistent homology is explained in more detail. FIGS. 13A to 13D are diagrams that illustrate persistent homology. The rule is that, when two balls abut each other, the centers of the two balls are connected with a line segment, and when three balls abut one another, the centers of the three balls are connected with a line segment. Here, only connected components and holes are considered. In the case (the radius r=0) of FIG. 13A, only connected components have appeared, and no holes appear. In the case (the radius r=r1) of FIG. 13B, a hole has appeared, and part of the connected components has disappeared. In the case (the radius r=r2) of FIG. 13C, more holes have appeared, and only one connected component remains. In the case (the radius r=r3) of FIG. 13D, the number of connected components is still one, and one hole has disappeared.

In the process of persistent homology computation, the birth radius and the death radius of a generator (i.e., hole) of a homology group are calculated. Barcode data is generable by using the birth radius and the death radius of a hole. As barcode data is generated for each hole dimension, multiple sets of barcode data in hole dimensions are combined to generate one set of barcode data. Sequential data is data representing the relationship between the radius (i.e., time) of a ball in persistent homology and a Betti number.

With reference to FIG. 14, the relationship between barcode data and generated sequential data is explained. FIG. 14 is a diagram that illustrates the relationship between barcode data and generated sequential data. The upper graph illustrated in FIG. 14 is a graph generated from barcode data, and the horizontal axis represents a radius. The lower graph is a graph generated from sequential data (Betti sequence); the vertical axis represents a Betti number, and the horizontal axis represents a time. As described above, a Betti number represents the number of holes and, for example, as the number of existing holes is 10 when the radius corresponds to the dashed line in the upper graph, the Betti number corresponding to the dashed line in the lower graph is also 10. The Betti number is counted for each block. Here, as the lower graph is a graph of quasi time-series data, a value in the horizontal axis does not have any meaning.

The PH processing unit 22 performs the above-described process on each set of time-series data with the time-shift term added thereto during the period of each sliding window to generate barcode data that corresponds to the period of each sliding window and stores it in the barcode data DB 15. Then, the PH processing unit 22 performs the above-described process to extract a dimension, a radius, and a Betti number from the barcode data during the period of each sliding window and stores them in the Betti-number data DB 16.

The detecting unit 23 is a processing unit that detects a state change in time-series data based on a Betti sequence generated by the PH processing unit 22. Specifically, the detecting unit 23 determines the scale (radius) monitored in a Betti sequence and detects a state change based on a change in a Betti number that varies in terms of time. FIG. 15 is a diagram that illustrates a technique for detecting a state change. As illustrated in FIG. 15, the detecting unit 23 determines "r0" as the scale to be monitored in a Betti sequence. Then, based on a time change in the Betti number with the scale "r0", the detecting unit 23 detects the time when the Betti number increases as a change point.

Here, the detection technique is explained in more detail. The detecting unit 23 reads a Betti sequence stored in the Betti-number data DB 16. Then, the detecting unit 23 calculates the distance between the read Betti sequence and the reference Betti sequence. For example, in the scale monitored, the detecting unit 23 calculates the distance between the read Betti sequence and the Betti sequence generated with regard to the sliding window a predetermined time earlier. Here, the sliding window a predetermined time earlier is the sliding window (e.g., the previous sliding window), the start time of which is prior to the start time of the sliding window for generating the target Betti sequence by a predetermined time. When there is no Betti sequence with regard to the sliding window a predetermined time earlier, the distance is calculated with the previously generated Betti sequence. Furthermore, the distance is, for example, Euclidean distance, norm distance, or cosine similarity. In the case of FIG. 15, it is the distance between a point A and a point B in the graph of the Betti sequence.

Then, the detecting unit 23 stores the calculated distance in the distance data DB 17. Furthermore, the detecting unit 23 stores the time when a distance more than a threshold is detected in the detection data DB 18 among the calculated distances. The time stored here corresponds to a change point. Furthermore, the above-described detection process may be performed after a process has been completed for all the sliding windows or may be performed in parallel with the process to generate a Betti sequence. Furthermore, the period (the time from the start time to the finish time) of a sliding window may be optionally set and may be set such that it contains a period during which successive sliding windows are overlapped. Moreover, the end point of a sliding window may be set to the end of time-series data, or it may be optionally set.

The output unit 24 is a processing unit that presents display data generated based on data stored in the detection data DB 18 on a display device, such as a monitor. For example, the output unit 24 generates Web pages, and the like, displaying a time that is data stored in the detection data DB 18 and presents it on the display device. Furthermore, the output unit 24 may also transmit the Web page, and the like, to the administrator's terminal.

Flow of Process

Figure 16:
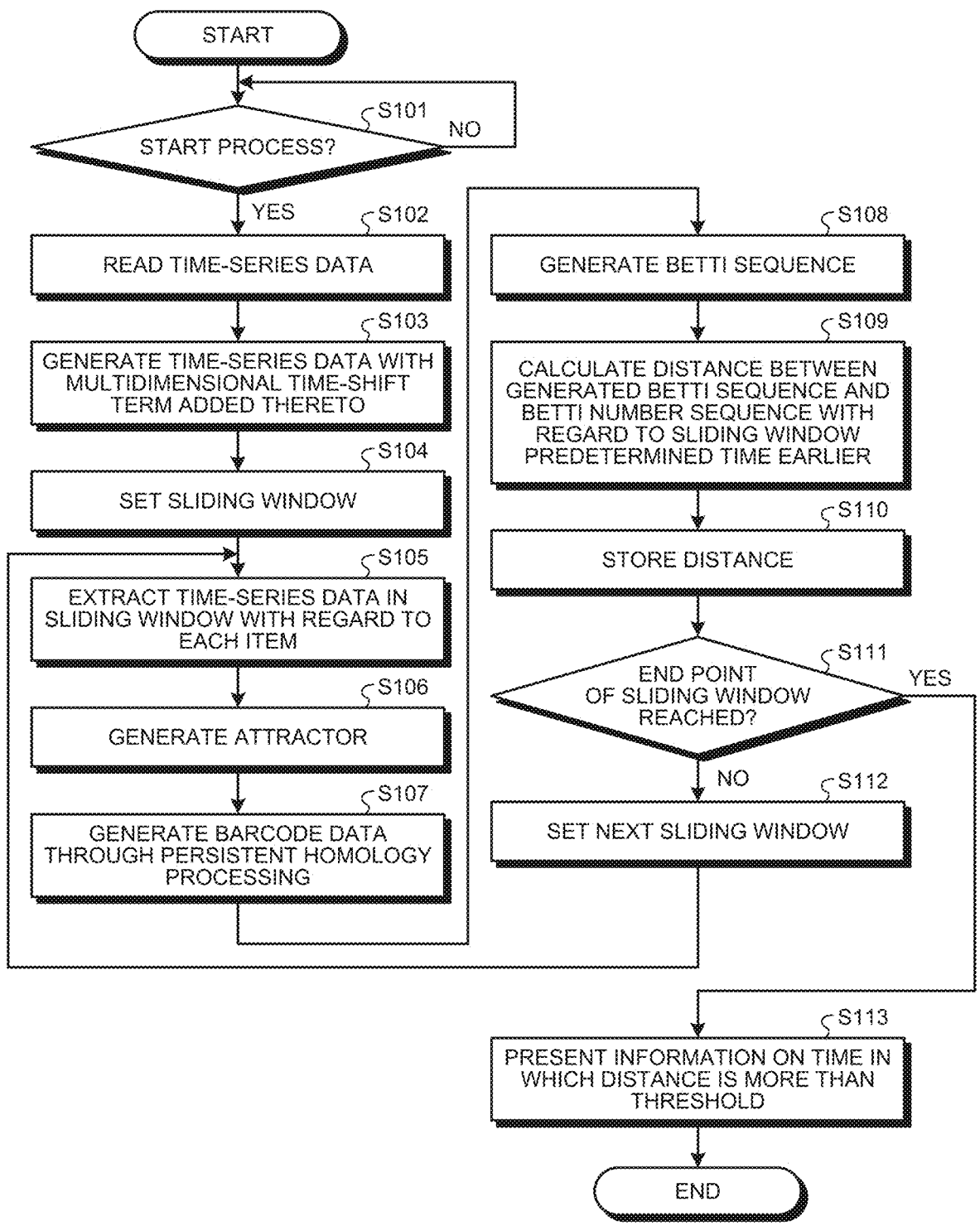
FIG. 16 is a flowchart that illustrates the flow of operations.

Next, a sequence of flow of the above-described operations is explained. FIG. 16 is a flowchart that illustrates the flow of the operations. The operation described here is an example, and the order of the operations may be appropriately changed to a degree that there is no contradiction.

As illustrated in FIG. 16, when a command for the start of a process, or the like, is received (S101: Yes), the attractor generating unit 21 reads time-series data from the time-series data DB 13 (S102) and generates time-series data with a multidimensional time-shift term added thereto (S103).

Then, the attractor generating unit 21 sets a sliding window (the start time and the length of the period) (S104) and extracts time-series data (time-series data with multidimensional time-shift term added thereto) in the sliding window with regard to each item (S105). Then, the attractor generating unit 21 generates an attractor from the extracted time-series data with the multidimensional time-shift term added thereto (S106).

Then, the PH processing unit 22 generates barcode data from an attractor through persistent homology processing (S107) and generates a Betti sequence from the barcode data (S108).

Then, the detecting unit 23 calculates the distance between the generated Betti sequence and the Betti sequence with regard to the sliding window a predetermined time earlier (S109) and stores the calculated distance in the distance data DB 17 (S110).

Here, when the end point of the sliding window is not reached (S111: No), the next sliding window is set (S112) and then S105 and subsequent steps are repeatedly performed. Conversely, when the end point of the sliding window is reached (S111: Yes), the output unit 24 presents information on the time in which the distance is more than the threshold (S113).

Advantage

As described above, the detection device 10 introduces a time-shift term to introduce effects of mutual interactions between previous sets of time-series data. The detection device 10 introduces a time-shift term for each dimension to observed multidimensional time-series data to generate virtual time-series data. Furthermore, the detection device 10 reconstructs an attractor in a higher-dimensional phase space by including the virtual time-series data that corresponds to unobserved data, thereby extracting the features of the entire system. Thus, the detection device 10 enables TDA learning regardless of the number of dimensions of the target system.

The detection device 10 may consider effects of time-series data that is not observed but is supposed to be present. The detection device 10 takes full advantage of multiple sets of observed time-series data so as to introduce effects of mutual interactions between the sets of time-series data as much as possible. The detection device 10 is expected to reconstruct attractors in a high-dimensional space with a high accuracy.

Figure 17:
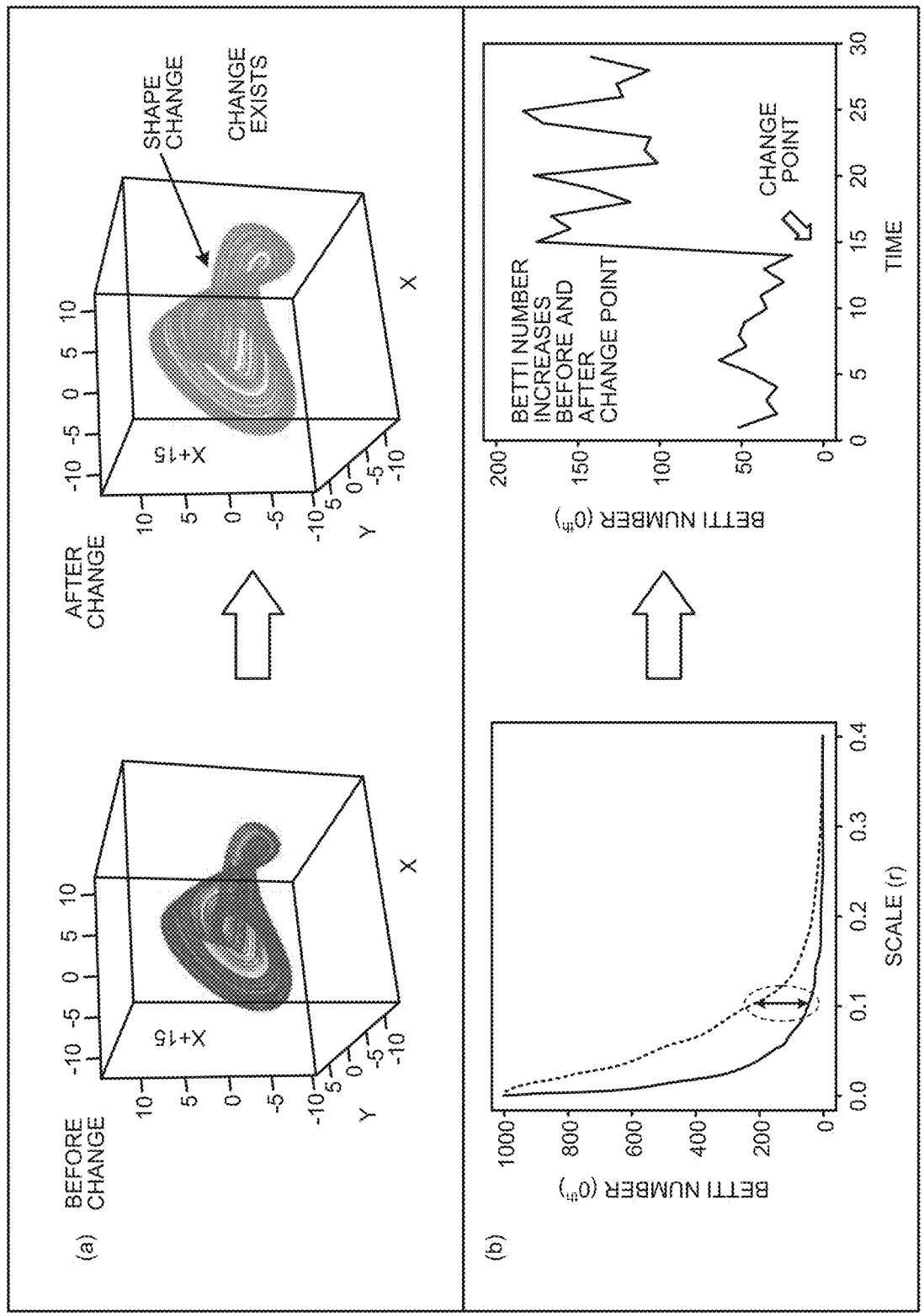
FIG. 17 is a diagram that illustrates an advantage.

FIG. 17 is a diagram that illustrates an advantage. FIG. 17 illustrates an example where the detection technique according to the first embodiment is conducted in the state of FIG. 3. In the above-described detection technique 1, only information on two-dimensional data of X, Y is applied to the attractor; according to the first embodiment, however, X+15 in three dimension is added so that information on three-dimensional data is applied to the attractor. Particularly, when a large change appears in data in three dimension, time-series data in three dimension is generated by using a time-shift term so that information on time-series data that has not been directly obtained may be applied to an attractor. Therefore, in the first embodiment, contrary to the detection technique 1, according to the result of the Betti sequence to which TDA is applied, temporary monitoring at the fixed scale r(=0.1) makes it possible to identify a change in the Betti number and detect a change point. That is, it is obtained for the first time by representing an attractor in three dimensions through the use of a time-shift term.

[b] Second Embodiment

Although the embodiment of the present invention has been explained above, the present invention may be implemented in various different embodiments other than the above-described embodiment.

Learning Technique

For the learning according to the first embodiment, other types of machine learning other than DL may be used. Furthermore, any number of dimensions of an attractor may be set. Moreover, for label estimation of the target data to be estimated after learning, the same process as that for learning is performed to make inputs to the learning model.

Combination with the Detection Technique 1

The detection technique according to the first embodiment and the above-described detection technique 1 may be combined. For example, according to the detection technique 1, a Betti sequence is generated from an attractor in a state where the time-shift term τ has not been added, and when a distance more than a first threshold and less than a second threshold is detected through a comparison between Betti sequences, or the like, the detection technique according to the first embodiment is used to generate an additional attractor to which the time-shift term τ has been added. Then, the above-described distance is calculated with regard to the Betti sequence that corresponds to the attractor generated by the detection technique 1 and the Betti sequence that corresponds to the additional attractor generated by the first embodiment to detect a state change in the multidimensional time-series data.

Criteria for the Time-Shift Term

In the first embodiment, although ten-dimensional time-series data when m=3 for $X_i$ and $Y_i$ and m=4 for $Z_i$ is explained, this is an example; there is no limitation on the number of dimensions, and the like, and it may be optionally set or changed depending on time-series data.

For example, consideration is given to the case where the motion characteristics of a certain super-high speed railway are examined; a gyroscope and an acceleration sensor are installed in a carriage, and when only one direction out of three directions is observed by each, it corresponds to the above-described X, Y. Furthermore, a wheel is provided with four observation devices, a temperature sensor, a pressure sensor, a distortion meter, and a sound collector, to observe the temperature of the wheel, the pressure, the volume, and the friction sound made with the rail so as to determine the state of the wheel; however, when only one of the types has been observed for some reason, it corresponds to the above-described Z. Furthermore, the time-shift term is information content that is needed to reconstruct an attractor from time-series data.

System

The operation procedures, the control procedures, the specific names, and the information including various types of data and parameters as described in the above specifications and the drawings may be optionally changed except as otherwise noted.

Furthermore, components of each device illustrated are functionally conceptual and is not always configured physically as illustrated in the drawings. That is, specific forms of separation and combination of each device are not limited to those depicted in the drawings. That is, a configuration may be such that all or some of them are functionally or physically separated or combined in any unit depending on various types of loads or usage. For example, a processing unit that displays items and a processing unit that estimates preferences may be implemented in separate chassis. Moreover, all or any of processing functions performed by devices may be implemented by a CPU (Central Processing Unit) or a program analyzed and executed by the CPU or may be implemented as wired logic hardware.

Hardware

Figure 18:
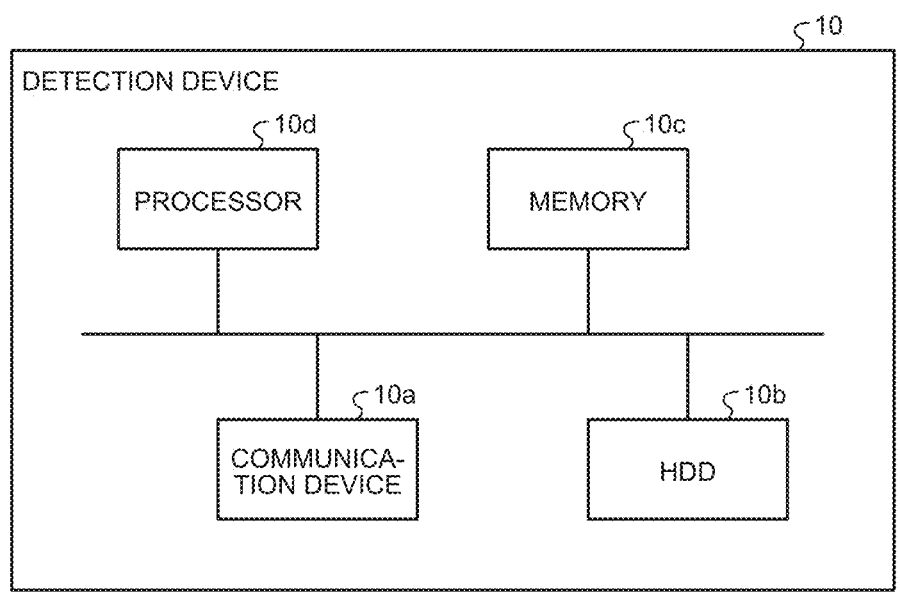
FIG. 18 is a diagram that illustrates an example of hardware configuration.

FIG. 18 is a diagram that illustrates an example of hardware configuration. As illustrated in FIG. 18, the detection device 10 includes a communication device 10a, an HDD (Hard Disk Drive) 10b, a memory 10c, and a processor 10d. Furthermore, the units illustrated in FIG. 12 are connected to one another via a bus, or the like.

The communication device 10a is a network interface card, or the like, and it communicates with other servers. The HDD 10b stores programs for implementing the functions illustrated in FIG. 2 and DBs.

The processor 10d reads a program for executing the same process as that of each processing unit illustrated in FIG. 2 from the HDD 10b, or the like, and loads it into the memory 10c, thereby implementing the process for executing each function explained in FIG. 2, and the like. That is, this process executes the same function as that of each processing unit included in the detection device 10. Specifically, the processor 10d reads a program having the same function as the attractor generating unit 21, the PH processing unit 22, the detecting unit 23, the output unit 24, or the like, from the HDD 10b, or the like. Then, the processor 10d executes the process for performing the same operation as that of the attractor generating unit 21, the PH processing unit 22, the detecting unit 23, the output unit 24, or the like.

In this way, the detection device 10 operates as an information processing device that reads and executes a program to implement the detection method. Furthermore, the detection device 10 may cause a medium reading device to read the above-described program from a recording medium and executes the read program to perform the same function as that according to the above-described embodiment. Furthermore, the programs according to other embodiments are not executed by the detection device 10 exclusively. For example, the present invention is also applicable to a case where other computers or servers execute programs or a case where they execute programs in cooperation with each other.

According to the embodiments, it is possible to improve the accuracy with which a state is determined based on multidimensional time-series data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   adding, with regard to each of a plurality of sets of time-series data including a plurality of items, a time-shift term to at least any of the plurality of items included in each of the plurality of sets of time-series data;
   generating a plurality of attractors from the plurality of sets of time-series data to which the time-shift term has been added;
   generating a plurality of Betti sequences from each of the plurality of attractors by executing a persistent homology transformation on each of the plurality of attractors, each of the plurality of Betti sequences indicating a correspondence relationship between a Betti number and a scale value has been used for the persistent homology transformation; and
   detecting a state change in the plurality of sets of time-series data based on a time change in the plurality of Betti sequences.

2. The non-transitory computer-readable recording medium according to claim 1, the process further comprising:
   generating an attractor from any of the sets of plurality of time-series data;
   generating an additional attractor from time-series data to which the time-shift term has been added; and
   detecting the state change based on a Betti sequence generated from the attractor and a Betti sequence generated from the additional attractor.

3. The non-transitory computer-readable recording medium according to claim 1, the process further comprising:
   determining a number of the plurality of time-shift terms for each of the plurality of items;
   generating a plurality of attractors from each of the plurality of sets of time-series data to which the determined time-shift term has been added;
   generating a plurality of Betti sequences from each of the plurality of attractors by executing the persistent homology transformation; and
   detecting the state change in the plurality of sets of time-series data based on a time change in the plurality of Betti sequences.

4. A detection method comprising:
   adding, with regard to each of a plurality of sets of time-series data including a plurality of items, a time-shift term to at least any of the plurality of items included in each of the plurality of sets of time-series data, using a processor;
   generating a plurality of attractors from the plurality of sets of time-series data to which the time-shift term has been added, using the processor;
   generating a plurality of Betti sequences from each of the plurality of attractors by executing a persistent homology transformation on each of the plurality of attractors, each of the plurality of Betti sequences indicating a correspondence relationship between a Betti number and a scale value has been used for the persistent homology transformation, using the processor; and
   detecting a state change in the plurality of sets of time-series data based on a time change in the plurality of Betti sequences, using the processor.

5. A detection device comprising:
   a memory; and
   a processor coupled to the memory and the processor configured to:
   add, with regard to each of a plurality of sets of time-series data including a plurality of items, a time-shift term to at least any of the plurality of items included in each of the plurality of sets of time-series data;
   generate a plurality of attractors from the plurality of sets of time-series data to which the time-shift term has been added;
   generate a plurality of Betti sequences from each of the plurality of attractors by executing a persistent homology transformation on each of the plurality of attractors, each of the plurality of Betti sequences indicating a correspondence relationship between a Betti number and a scale value has been used for the persistent homology transformation; and
   detect a state change in the plurality of sets of time-series data based on a time change in the plurality of Betti sequences.

* * * * *